No. 867,759. PATENTED OCT. 8, 1907.
C. I. SAUNDERS.
FENCE.
APPLICATION FILED MAY 20, 1907.
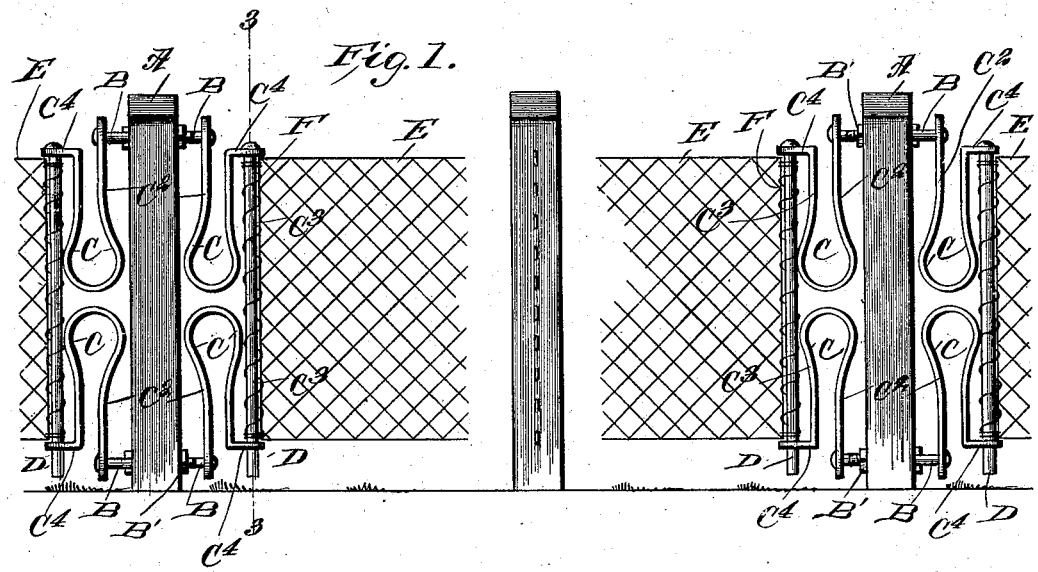
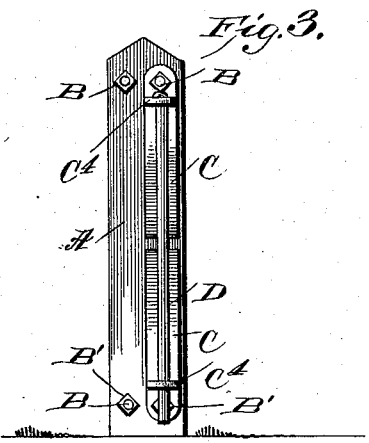
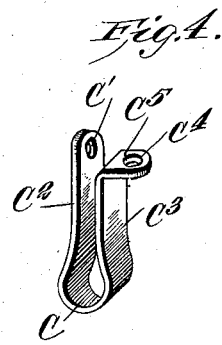
WITNESSES
E. M. Callaghan,
Perry B. Turpin.
INVENTOR
CROCKETT I. SAUNDERS
BY Munn & Co.
ATTORNEYS.

UNITED STATES PATENT OFFICE.

CROCKETT I. SAUNDERS, OF FOWLER, SOUTH CAROLINA.

FENCE.

No. 867,759.　　　　Specification of Letters Patent.　　　　Patented Oct. 8, 1907.

Application filed May 20, 1907. Serial No. 374,584.

*To all whom it may concern:*

Be it known that I, CROCKETT I. SAUNDERS, a citizen of the United States, and a resident of Fowler, in the county of Williamsburg and State of South Carolina, have invented certain new and useful Improvements in Fences, of which the following is a specification.

My invention is an improvement in fences, and especially in the constructions whereby the fence wire may be tightened up; and the invention consists in certain novel constructions and combinations of parts as will be hereinafter described and claimed.

In the drawing Figure 1 is a side view partly broken away of a section of fence embodying my invention. Fig. 2 is a top plan view thereof. Fig. 3 is a detail view illustrating one of the posts and the loop springs in connection therewith, and Fig. 4 is a detail perspective view of one of the springs.

In the construction shown the posts A have openings through which extend the bolts B, which connect at one end with the loop springs and are threaded at their other ends to receive the nuts B' by turning which the bolts may be turned to adjust the tension on the springs. As best shown in Figs. 2 and 3, the bolts which secure the panels on one side of each post are set alongside of or in different vertical planes from the bolts which secure the next panel to such particular post in order to prevent any interference between the bolts and permit the adjustment of same independently as may be desired.

As stated the bolts connect at one end with the springs and this is effected by passing the bolts through openings $C'$ in what for convenience of reference I term the post-wings $C^2$ of the springs C, the other or panel wings $C^3$ of said springs being provided at their free extremities with horizontal lugs $C^4$ which are perforated at $C^5$ to receive the rod D. In practice the springs C which are alike are employed in pairs and reversed so that the bowed portions of the upper springs on the opposite sides of the same post are arranged at the lower ends of said upper springs and adjacent to the bowed ends of the lower complementary springs which are arranged with their bowed ends uppermost with the lugs $C^4$ of the upper and lower springs arranged with their openings $C^5$ in alinement so the rods D may be passed through said openings in connecting the said rods with the springs as desired. Each panel of the fence is provided with these rods D at its opposite ends and when such panels are provided with woven wire fencing, as shown, at E, it is secured to the opposite rods D by means of a soft wire F tied at one end to one end of the rod D and then woven through the meshes of the woven wire E and wrapped around the rod D from end to end thereof in order to secure the woven wire as will be understood from Fig. 1.

When the woven wire is applied as shown in Fig. 1 and the springs C are under tension they will operate to stretch the woven wire and hold the same taut in such manner as to be effective and present a good appearance in use.

Manifestly in practice the springs C may be arranged at one or both ends of the panel of the fence, and by tightening up on the taps or nuts B' the tension of the springs C may be increased as found necessary.

In Fig. 1, I show a post intermediate those provided with the stretching devices and in securing the wire to said intermediate or middle post it is preferred to employ small staples as indicated in Fig. 1 and in driving said staples to leave them sufficiently slack to permit the wire to move through them in expanding and contracting.

In employing my invention in connection with barb wire and in stringing the latter, panels of say fifty yards are employed and the barb wire secured at one end to one post and then stretched to the second post and tied to the rod D with a small soft wire tied around the barb wire adjacent to the barb nearest the rod D. After this is done the fence wire may be fastened to the edge of the adjacent post leaving the wire slack between this fastening or connection and the rod D so it will not interfere with the working of the spring in the first panel. When this is done the wire may be stretched to form the second panel and secured to the next post in similar manner as before described in connection with the rod D and so on to the end of the wire. This avoids any cutting of the barb wire and permits the springs to operate in connection with each panel as will be understood.

In using springs at both ends of the panel the wire may be tied to the rod at the first post and stretched to the second post and tied with a small wire and then carried around to the rod D on the third spring and tied to the rod D tight and fast so that it cannot slip in stretching to the next spring and so on to the end of the roll of wire.

I claim—

1. The improvement in fences herein described comprising the combination of a post, bolts passing through the same and arranged in different vertical planes, the said bolts being arranged in pairs, loop springs having post wings provided with openings for the bolts, said springs being arranged in pairs with their bow portions adjacent to each other midway between the ends of the posts and having their panel wings provided at their free extremities with horizontal lugs having openings with the openings of each pair of springs in alinement and rods passed through said openings in the horizontal lugs, substantially as set forth.

2. The combination in a fence, of fence material a post, a tension spring in the form of a bow having an upright post wing, and means connecting the same at its free end with the post the tension spring having its bow portion free of connection with the post and also provided with a panel wing on the panel side of the post and between the latter and the fence material and having at its free extremity a horizontal perforated lug, and intermediate devices between the fence material and said horizontal lug, substantially as set forth.

3. The combination of a post, upper and lower bow springs with their bow portions arranged adjacent to each other and having post wings connected at their free ends with the post, and panel wings the bow spring being at its bow portion free of connection with the post, substantially as set forth.

4. The combination of the post fence material, bow springs between the post and the fence material and arranged one above the other and having wings connected at their free ends with the post and also provided with panel wings the bow springs, being disconnected at their intermediate or bow portions from the post, and means whereby the fence material may be secured in connection with the panel wings of the bow springs, substantially as set forth.

5. The combination with the post and fence material, of bow springs having panel wings connected with the fence material and also having post wings provided with openings, and bolts passed through said openings and through their respective posts, and nuts on said bolts, substantially as set forth.

6. The combination with a post, of upper and lower bow springs having their bow portions arranged adjacent to each other and provided with post wings, and means for securing the same to the post, the springs also having panel wings provided with horizontal lugs, the lugs of each pair of springs having openings in alinement, a rod in said openings, and fence material secured to the rod between the horizontal lugs, substantially as set forth.

CROCKETT I. SAUNDERS.

Witnesses:
J. T. ROLLINS,
T. M. COOPER.